(12) United States Patent
Lin

(10) Patent No.: US 8,358,581 B2
(45) Date of Patent: *Jan. 22, 2013

(54) METHOD FOR ADJUSTING SIGNAL DELIVERY BANDWIDTH, MEDIA GATEWAY AND MEDIA GATEWAY CONTROLLER

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

This patent is subject to a terminal disclaimer.

(21) Appl. No.: 12/824,556

(22) Filed: Jun. 28, 2010

(65) Prior Publication Data

US 2010/0260195 A1 Oct. 14, 2010

Related U.S. Application Data

(63) Continuation of application No. PCT/CN2008/073411, filed on Dec. 10, 2008.

(30) Foreign Application Priority Data

Dec. 28, 2007 (CN) .......................... 2007 1 0032976

(51) Int. Cl.
H04L 12/28 (2006.01)
(52) U.S. Cl. ........................................ 370/230; 370/252
(58) Field of Classification Search .................. 370/252, 370/401, 465
See application file for complete search history.

(56) References Cited

U.S. PATENT DOCUMENTS

| | | | |
|---|---|---|---|
| 2003/0009337 A1* | 1/2003 | Rupsis ......................... | 704/260 |
| 2003/0169751 A1* | 9/2003 | Pulkka et al. ................. | 370/401 |
| 2004/0101125 A1* | 5/2004 | Graf et al. ..................... | 379/229 |
| 2006/0222110 A1 | 10/2006 | Kuhtz | |

FOREIGN PATENT DOCUMENTS

| | | |
|---|---|---|
| CN | 1575574 A | 2/2005 |
| CN | 1801731 A | 7/2006 |
| JP | 2002-135330 | 5/2002 |

OTHER PUBLICATIONS

International Telecommunication Union, "Series H: Audiovisual and Multimedia Systems, Infrastructure of audiovisual services—Communication procedures", ITU-T Telecommunication Standardization Sector of ITU. H.248.1, 206 pages, (Sep. 2005).

(Continued)

*Primary Examiner* — Mark Rinehart
*Assistant Examiner* — Matthew Hopkins
(74) *Attorney, Agent, or Firm* — Conley Rose, P.C.; Grant Rodolph

(57) ABSTRACT

A method for adjusting a signal delivery bandwidth is provided. The method includes the following steps: A media gateway (MG) receives a command request carrying signal delivery bandwidth adjusting information, and the MG adjusts the signal delivery bandwidth according to the signal delivery bandwidth adjusting information. An MG and a media gateway controller (MGC) are also provided. By extending the media gateway control protocol (H.248 or MGCP), the delivery bandwidth adjusting information of a signal is transferred while the signal is transferred, the signal is adjusted according to the signal delivery bandwidth adjusting information, a signal and/or signal list corresponding to the signal delivery bandwidth adjusting information is transferred simultaneously, and the executing process of the signal remains uninterrupted.

7 Claims, 2 Drawing Sheets

OTHER PUBLICATIONS

International Search Report from P.R. China in International Application No. PCT/CN2008/073411 mailed Mar. 19, 2009.
Second Chinese Office Action of Chinese Patent Application No. 200710032976.7; mailing date of Aug. 18, 2011; (2 pgs.).
European Patent Office Communication regarding the extended European search report, regarding International Patent Application No. 08871471.2-2413/2237502; mailing date of Sep. 20, 2011; (9 pgs.).
XP-002617536; Rapporteur Meeting of Questions 2,3,4,5,12,13,21,22,24,25 & 29/16; Telecommunication Standardization Sector; Study Period: 2005-2008; TD-T3 Study Group 16 Original: English; Source: Editor H.248.RTSP; Title: H.248.RTSP Editor's Output; (41 pgs.).
ETSI ES 283 018 V.2.0.9 (Jun. 2007); ETSI Standard; Telecommunications and Internet converged Services and Protocols for Advanced Networking (TISPAN); Resource and Admission Control: H.248 Profile for controlling Boarder Gateway Functions (BGF) in the Resource and Admission Control Subsystem (RACS); Protocol specification; (144 pgs.).
Schulzrinne Columbia University a RAO Cisco R. Lanphier Real Networks M Westerlund Ericsson AB M Stiemerling (ED) NEC H: "Real Time Streaming Protocol 2.0 (RTSP); draft-ietf-mmusic-rfc2326bis-16.txt"; IETF Standard-Working-Draft, Internet Engineering Task Force, IETF, CH, vol. mmusic, No. 16, Nov. 19, 2007, XP015053589, ISSN: 0000-0004, Sections 16.40, 16.41; (228 pgs.).
Translation of Russian Office Action in regards to International Patent Application No. 2010131625/07 (044734); dated Dec. 10, 2008; Huawei Technologies Co., Ltd.; (2 pgs.).
English translation of Written Opinion of the International Searching Authority, issued by The State Intellectual Property Office, P.R. China, mailed Mar. 19, 2009, in the PCT/CN2008/073411, 4 pages.
First Chinese Office Action in Chinese Application No. 200710032976.7 and English translation, 7 pages.
Partial English Translation of CN1801731A, 2 pages.

* cited by examiner

METHOD FOR ADJUSTING SIGNAL DELIVERY BANDWIDTH, MEDIA GATEWAY AND MEDIA GATEWAY CONTROLLER

CROSS-REFERENCE TO RELATED APPLICATIONS

This application is a continuation of International Application No. PCT/CN2008/073411, filed on Dec. 10, 2008, which claims priority to Chinese Patent Application No. 200710032976.7, filed on Dec. 28, 2007, both of which are hereby incorporated by reference in their entireties.

FIELD OF THE TECHNOLOGY

The present invention relates to the field of communications technologies, and more particularly to a method for adjusting signal delivery bandwidth, a media gateway (MG), and a media gateway controller (MGC).

BACKGROUND OF THE INVENTION

Media gateway controller (MGC) and media gateway (MG) are two key components in a packet-based network with an architecture where services are separated from bearers. The MGC is mainly responsible for service control, while the MG is mainly responsible for media bearing. The gateway-separation architecture formed by the MGC and the MG realizes the separation of a service control plane and a media bearing plane, so that network resources can be better shared, device upgrading and service extension can be simplified, and the development and maintenance costs can be reduced.

The MG and the MGC communicate with each other by using a media gateway control protocol. The currently prevalent protocols include the H.248/Gateway Control Protocol (MeGaCo) and MGCP. The MGCP is developed and amended by the Internet Engineering Task Force (IETF). The H.248/MeGaCo protocol is developed based on the MGCP. H.248/MeGaCo version 1 was set down by the IETF and the International Telecommunications Union (ITU) together in November, 2000 and was amended in June, 2003. H.248 version 2 was set down by the ITU in May, 2002 and was amended in March, 2004. H.248 version 3 was set down by the ITU in September, 2005.

Currently, a connection model defined by the H.248/MeGaCo protocol includes termination and context. A termination is a logic entity in the MG (the MG itself may also be represented as a termination called a Root termination), which is used for sending and receiving one or more media. Terminations are further divided into Physical terminations and Ephemeral terminations. Physical terminations represent some semi-permanent physical entities such as Time Division Multiplex (TDM) timeslots or analog lines. Ephemeral terminations represent some public resources that are applied for temporarily and released after being used, for example, streams based on the Real-time Transport Protocol (RTP). The characteristics of a termination are represented with Property, Signal, Event, Statistic, etc (which are referred to as parameter descriptors), and a package is introduced to combine various characteristic parameters of the termination. In addition, a context represents an association between terminations. One context may include a plurality of terminations, and a topology is used for describing interrelations between the terminations. A termination that is not associated with other terminations yet is contained in a special context called a Null context. The context is created when the first termination is added, and is released when the last termination is removed.

Based on the abstract connection model, an interaction between a service and a bearer is actually an operation on terminations and context, which is realized by the Request and Reply of the command between the MGC and the MG. The types of the command include Add, Modify, Subtract, Move, AuditValue, AuditCapabilities, Notify, ServiceChange, etc.

A signal is adopted by the MGC to instruct the MG to perform a resource operation, for example, playing tone. The signal is executed in termination or stream level, and when the signal is executed on a termination, it indicates that the signal is applicable to all streams on the termination. A series of operations that need to be performed sequentially may be represented in a form of a signal list, and intervals may exist among operations. The MGC includes a signal and/or signal list in a signal descriptor and delivers the signal descriptor to the MG. The signals and/or signal lists in the signal descriptors that are delivered at the same time are executed synchronously.

The control over signal delivery bandwidth is exercised according to certain settings in advance, for example, the speed for transferring a configured medium is 100 Kbps by default. Subsequently, the medium is transferred at this speed, but a possibility of adjusting a signal delivery bandwidth exists in actual applications, for example, it is expected that the medium in the above instance is transferred at a speed of 500 Kbps or 50 Kbps, so as to preview the medium at a higher or lower speed or at a high or low quality. At present, the MGCP cannot support the adjustment of a signal delivery bandwidth.

SUMMARY OF THE INVENTION

Accordingly, embodiments of the present invention are directed to a method for adjusting signal delivery bandwidth, an MG, and an MGC, and thus a simple and highly efficient solution is provided for adjusting signal delivery bandwidth.

To achieve the above objects, in an embodiment, the present invention provides a method for adjusting a signal delivery bandwidth, which includes the following steps.

An MG receives a command request carrying signal delivery bandwidth adjusting information.

The MG adjusts a signal delivery bandwidth according to the signal delivery bandwidth adjusting information.

Correspondingly, in an embodiment, the present invention provides an MG, which includes a receiving unit and an adjusting unit.

The receiving unit is configured to receive a command request carrying signal delivery bandwidth adjusting information.

The adjusting unit is configured to adjust a signal delivery bandwidth according to the signal delivery bandwidth adjusting information carried in the command request received by the receiving unit.

Correspondingly, in an embodiment, the present invention further provides an MGC, which includes a sending unit.

The sending unit is configured to send a command request carrying signal delivery bandwidth adjusting information, and send a signal and/or signal list corresponding to the signal delivery bandwidth adjusting information.

The MG of the embodiments of the present invention adjusts a signal delivery bandwidth through signal delivery bandwidth adjusting information carried in an extended media gateway control protocol (H.248 or MGCP) message, and thus a simple and highly efficient solution is provided for adjusting a signal delivery bandwidth.

DETAILED DESCRIPTION OF THE EMBODIMENTS

The embodiments of the present invention are further illustrated as follows in detail with reference to the accompanying drawings.

Figure 1:
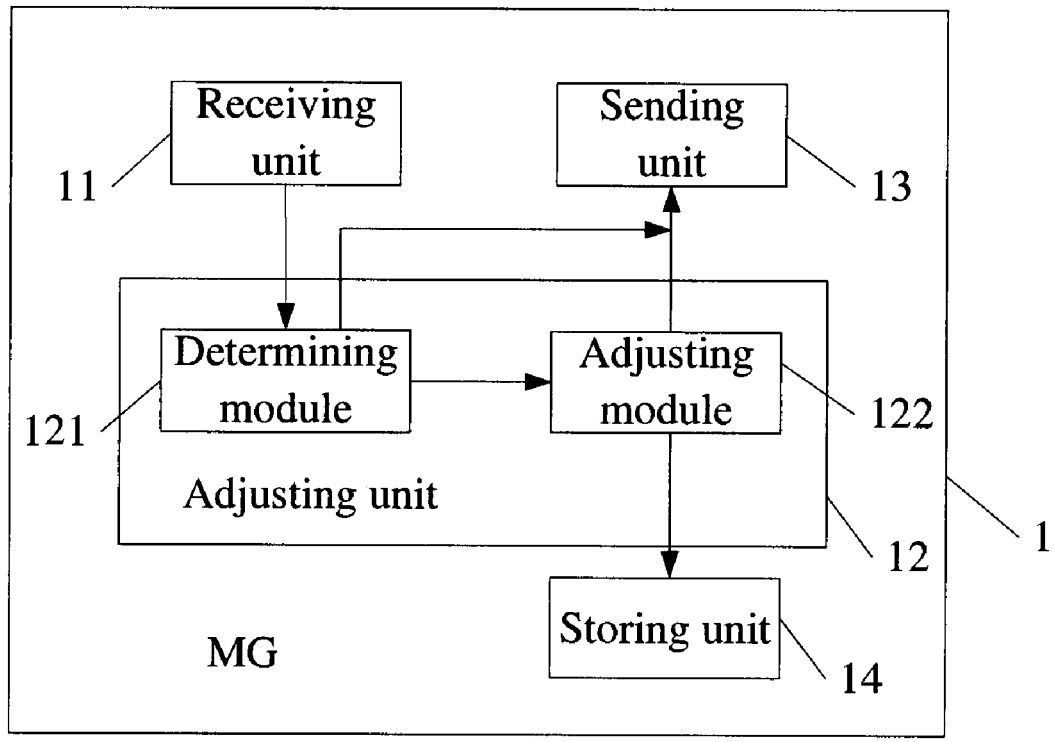
FIG. 1 is a schematic structural diagram of an MG according to an embodiment of the present invention.

FIG. 1 is a schematic structural diagram of an MG according to an embodiment of the present invention. As shown in FIG. 1, an MG 1 provided in the embodiment of the present invention includes a receiving unit 11 and an adjusting unit 12.

The receiving unit 11 is configured to receive a command request carrying signal delivery bandwidth adjusting information. In specific implementation, the receiving unit 11 is further configured to receive a signal and/or signal list corresponding to the signal delivery bandwidth adjusting information while receiving the command request, so as to indicate the validity of the signal and/or signal list and indicate that an executing process of the signal and/or signal list may remain uninterrupted.

The adjusting unit 12 is configured to adjust a signal delivery bandwidth according to the signal delivery bandwidth adjusting information carried in the command request received by the receiving unit 11.

The adjusting unit 12 further includes a determining module 121 and an adjusting module 122.

The determining module 121 is configured to determine whether a signal identifier and/or signal list identifier in the signal delivery bandwidth adjusting information matches with a signal and/or signal list on a corresponding termination or stream, or whether a media resource identifier in a delivery bandwidth signal matches with a corresponding media resource.

The adjusting module 122 is configured to adjust the signal delivery bandwidth according to a determining result of the determining module.

As shown in FIG. 1, the MG further includes a storing unit 14 and a sending unit 13.

The storing unit 14 is configured to store the signal and/or signal list corresponding to the signal delivery bandwidth adjusting information when the adjusting module 122 adjusts the signal delivery bandwidth, so as to indicate the validity of the signal and/or signal list and indicate that an executing process of the signal and/or signal list may remain uninterrupted.

The sending unit 13 is configured to send a command response carrying error response information or adjusted signal delivery bandwidth information.

Figure 2:
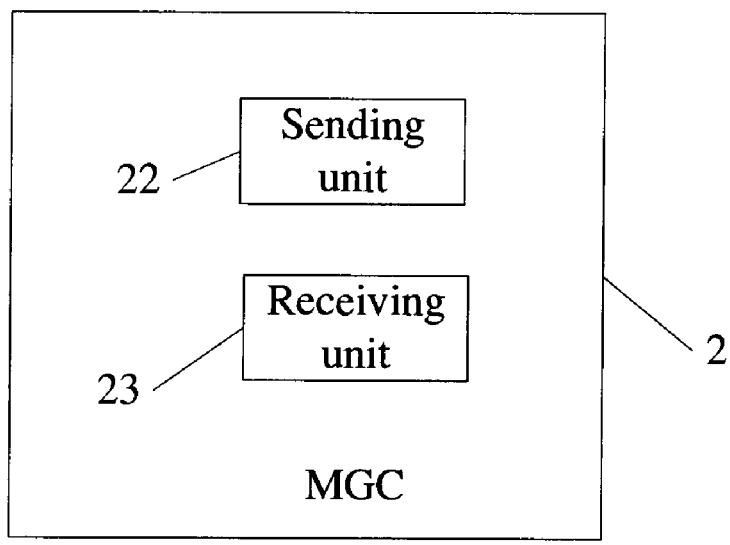
FIG. 2 is a schematic structural diagram of an MGC according to an embodiment of the present invention.

As shown in FIG. 2, an MGC is provided according to the embodiment of the present invention. An MGC 2 includes a sending unit 22 and a receiving unit 23.

The sending unit 22 is configured to send a command request carrying signal delivery bandwidth adjusting information, and send a signal and/or signal list corresponding to the signal delivery bandwidth adjusting information.

The receiving unit 23 is configured to receive a command response carrying error response information or adjusted signal delivery bandwidth information.

When signal delivery bandwidth needs adjusting, the sending unit 22 of the MGC 2 sends a command request to the MG 1, where the command request carries signal delivery bandwidth adjusting information. The receiving unit 11 of the MG 1 receives the command request carrying the signal delivery bandwidth adjusting information sent form the MGC 2. The signal delivery bandwidth adjusting information includes a ratio of a speed, which a signal is requested to be adjusted to, to a normal speed, and further includes the following parameter information: one selected from a signal identifier, a signal list identifier, and a media resource identifier, or any combination thereof. The signal identifier is used for identifying a signal that needs to be adjusted; the signal list identifier is used for identifying a signal list that needs to be adjusted; and the media resource identifier is used for identifying a media resource that needs to be adjusted. The determining module 121 in the adjusting unit 12 of the MG 1 determines whether the signal identifier and/or signal list identifier in the signal delivery bandwidth adjusting information matches with the signal and/or signal list on the corresponding termination or stream, or whether the media resource identifier in the delivery bandwidth signal matches with the corresponding media resource according to the signal delivery bandwidth adjusting information in the command request received by the receiving unit 11 of the MG 1. When the determining result is Yes, the adjusting module 122 in the adjusting unit 12 of the MG 1 adjusts the signal delivery bandwidth according to the signal delivery bandwidth adjusting information; and when the determining result is No, the sending unit 13 of the MG 1 sends error response information to the MGC 2. After the adjusting module 122 in the adjusting unit 12 of the MG 1 has adjusted the signal delivery bandwidth, the sending unit 13 of the MG 1 sends a command response to the MGC 2, where the command response carries signal delivery bandwidth adjusting information, and the signal delivery bandwidth adjusting information includes a ratio of an actual speed after a signal is adjusted to a normal speed. The sending unit 22 of the MGC 2 sends the signal and/or signal list corresponding to the signal delivery bandwidth adjusting information while sending the command request. The receiving unit 11 of the MG 1 receives the signal and/or signal list corresponding to the signal while receiving the command request, so as to enable the signal and/or signal list to continue to be valid; or after the MG 1 receives the signal delivery bandwidth adjusting information sent by the MGC 2, the storing unit 14 of the MG 1 stores the signal and/or signal list while the adjusting unit 12 of the MG 1 adjusts the signal and/or signal list corresponding to the signal, so as to keep the executing process of the signal uninterrupted.

In the above process, the adjusting unit 12 of the MG 1 adjusts the signal delivery bandwidth corresponding to one of the signal identifier, the signal list identifier, the media resource identifier or any combination thereof according to the above ratios. The ratio of the speed, which the signal is requested to be adjusted to, to the normal speed and the ratio of the actual speed after the signal is adjusted to the normal speed adopt a unified ratio parameter or independent ratio parameters. When the unified ratio parameter is adopted, the received ratio parameter is the ratio of the speed, which the signal is requested to be adjusted to, to the normal speed, and the sent ratio parameter is the ratio of the actual speed after the signal is adjusted to the normal speed.

The signal delivery bandwidth adjusting information is represented by a signal, and meanwhile the ratios, the signal identifier, the signal list identifier and/or the media resource identifier in the information are represented by parameters of the signal, or the ratio is represented by a property.

Figure 3:
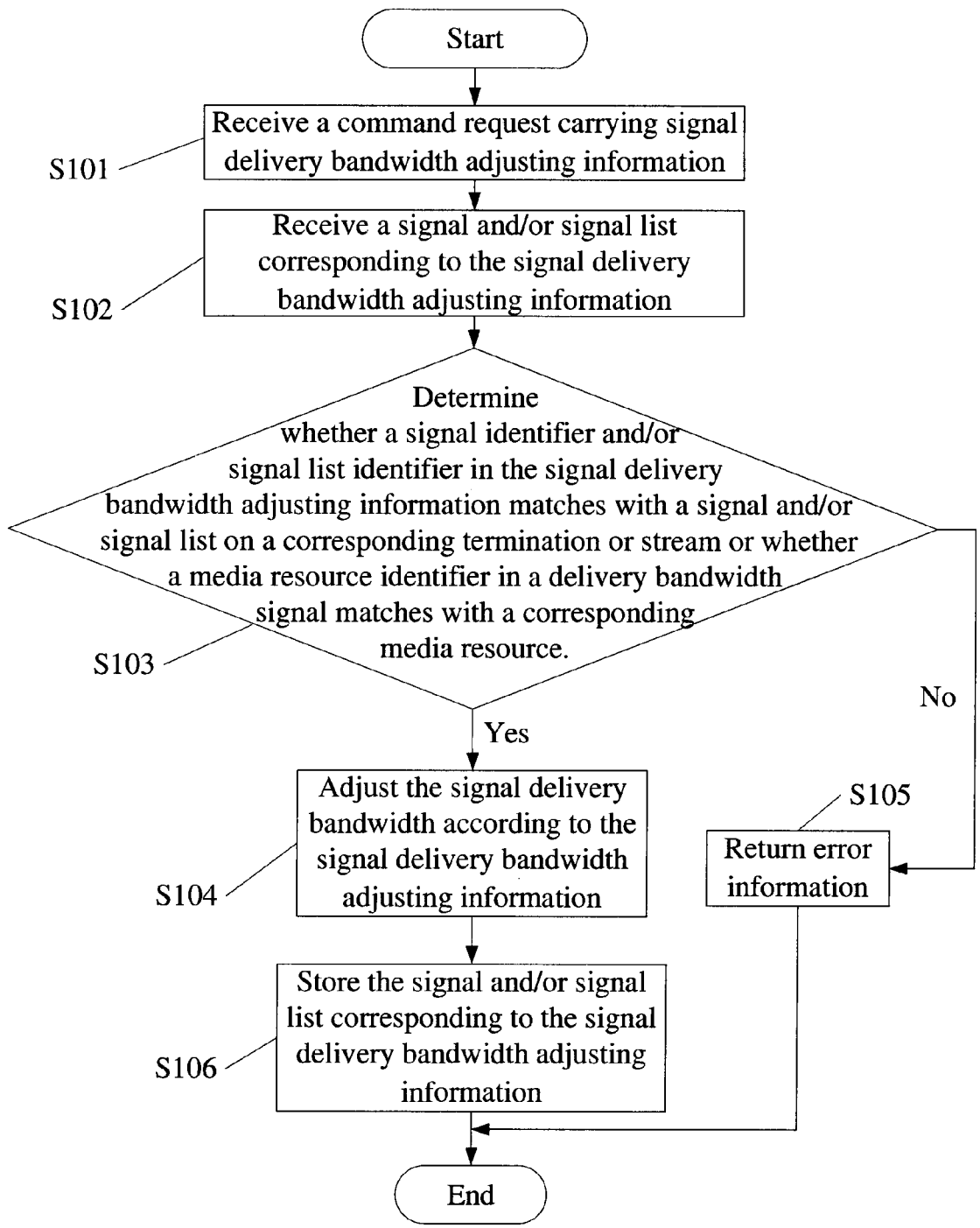
FIG. 3 is a schematic flow chart of a method for adjusting a signal delivery bandwidth according to an embodiment of the present invention.

Correspondingly, in an embodiment, the present invention further provides a method for adjusting a signal delivery bandwidth, where delivery bandwidth adjusting information for a signal is transferred while transferring the signal through extending a media gateway control protocol (H.248 or MGCP). FIG. 3 is a schematic flow chart of a method for adjusting a signal delivery bandwidth according to an embodiment of the present invention. As shown in FIG. 3, the method includes the following steps.

In step S101, a command request is received, where the command request carries signal delivery bandwidth adjusting information.

In step S102, a signal and/or signal list corresponding to the signal delivery bandwidth adjusting information is received. In the specific implementation, step S102 aims at indicating a validity of the signal and/or signal list and indicating that an executing process of the signal and/or signal list may remain uninterrupted.

In step S103, it is determined whether a signal identifier and/or signal list identifier in the signal delivery bandwidth adjusting information matches with a signal and/or signal list on a corresponding termination or stream or whether a media resource identifier in a delivery bandwidth signal matches with a corresponding media resource.

When the determining result is Yes, step S104 is executed; and when the determining result is No, step S105 is executed.

In step S104, the signal delivery bandwidth is adjusted according to the signal delivery bandwidth adjusting information.

In step S105, error information is returned.

In step S106, the signal and/or signal list corresponding to the signal delivery bandwidth adjusting information is stored. In the specific implementation, the purpose of performing step S106 is the same as that of step S102, so that only one of them needs to be performed.

The following step is performed after step S104: A command response is sent. The signal delivery bandwidth adjusting information in the command response includes the ratio of the actual speed after the signal is adjusted to the normal speed.

The delivery bandwidth adjusting information is represented by a signal or property.

When the delivery bandwidth adjusting information is represented by a signal, a delivery bandwidth is represented by a signal in the embodiment of the present invention, for example, a signal named as "Delivery Bandwidth (DB)". The signal may be defined in an existing package or a new package, for example, a new package named as a "Signal Delivery Bandwidth Adjustment (SDBA) package". The signal may be applied to a termination or a stream on the termination. If the signal is included in a signal descriptor delivered to a certain termination or a stream, it indicates that a signal delivery bandwidth adjusting needs to be performed on the termination or the stream.

The signal may further include any combination of the following parameters:

1. Signal Identifier (SI), representing a signal that needs to be adjusted. The type of the SI is a character string, and the format of the SI is "package identifier/signal identifier";

2. Signal List Identifier (SLI), representing a signal list that needs to be adjusted. The type of the SLI is an integer;

3. Media Resource Identifier (MRI), representing a media resource that needs to be adjusted. The type of the MRI is a character string, for example, Uniform Resource Identifier (URI) or Internationalized Resource Identifier (RI) may be adopted. When a plurality of instances of the same type of signal exists on one termination or stream, they can be distinguished from one another through MRIs;

4. Speed, representing a ratio of an adjusted speed to a normal speed. If the type of character string or floating point is adopted, the value of 1 may be defined to represent being equal to the normal speed, so that 2 represents twice of the normal speed, and 0.5 represents half of the normal speed. If the type of integer is adopted, the value may be defined as a percentage, where 100 represents being equal to the normal speed, 200 represents twice of the normal speed, and 50 represents half of the normal speed. 0 may be defined as representing pause or defined as meaninglessness.

The MGC may deliver the ratio of the speed, that needs to be adjusted to, to the normal speed to the MG using the above speed parameter (downstream), and the MG may report, using the above speed parameter (upstream), to the MGC the ratio of the actual speed, that is adjusted to, to the normal speed. On the contrary to the method using the unified speed parameter, another method is to define an independent parameter for upstream and downstream respectively, for example, a speed parameter to be delivered by the MGC to the MG is named as "Requested Speed (RS)", and a ratio parameter to be reported to the MGC by the MG is named as "Actual Speed (AS)", where the types and the values thereof are the same as the above speed parameter.

When the delivery bandwidth adjusting information is represented by a property, the ratio of the adjusted speed to the normal speed is represented by one property in the embodiment of the present invention, for example, a property named as "Delivery Bandwidth Speed (DBS)". The property may be defined in an existing package or a new package, for example, a new package named as an "SDBA package".

The type and the value of the property are the same as the above speed parameter, and the property is readable and writable. When the property is sent by the MGC to the MG, the property represents a ratio of the requested speed to the normal speed, which is defined as keeping the current speed by default; when the property is sent by the MG to the MGC, the property represents a ratio of the actual speed to the normal speed, which is defined as adopting the requested ratio by default. The property may be applied to a termination or a stream on the termination, and may be correspondingly used in a TerminationState descriptor or a LocalControl descriptor respectively, representing adjusting the delivery bandwidth for all signals on the termination or the stream.

In the method for adjusting a signal delivery bandwidth provided in the embodiment of the present invention, according to the definition of the H.248, a signal is adopted by the MGC to instruct the MG to perform a certain resource operation, for example, playing tone. When the MGC needs to adjust a delivery bandwidth of a certain signal or a certain set of signals, the MGC delivers a delivery bandwidth signal to a corresponding termination or stream on the MG. The MGC may deliver the signal to the MG through a command request such as Add, Modify, Move, Subtract, or the like. Then, after execution, the MG returns a command response to the MGC.

The delivery bandwidth signal may include any combination of the signal identifier, the signal list identifier, and the media resource identifier that need to be adjusted. The combination thereof has the following meanings.

1. If the delivery bandwidth signal delivered by the MGC does not include the signal identifier, the signal list identifier, or the media resource identifier that needs to be adjusted, the MG should adjust all the signals or signal lists on the termination or the stream.

2. If the delivery bandwidth signal delivered by the MGC includes the signal identifier and/or the signal list identifier that needs to be adjusted, the MG should adjust a signal corresponding to the signal identifier and/or a signal list corresponding to the signal list identifier on the termination or the stream.

3. If the delivery bandwidth signal delivered by the MGC includes only the media resource identifier that needs to be adjusted, the MG should adjust all the signals or signal lists associated with a media resource corresponding to the media resource identifier on the termination or the stream.

4. If the delivery bandwidth signal delivered by the MGC includes the media resource identifier that needs to be adjusted, and the signal identifier and/or the signal list identifier, the MG should adjust a signal corresponding to the signal identifier and/or a signal list corresponding to the signal list identifier associated with a media resource corresponding to the media resource identifier on the termination or the stream.

If the signal identifier and/or signal list identifier included in the delivery bandwidth signal delivered by the MGC does not match with the termination or the stream or the media resource corresponding to the media resource identifier included in the delivery bandwidth signal, for example, the signal and/or signal list does not exist or has been completed, the MG should return an error response to the MGC, for example, an error code 473 (representing incompatible characteristic values).

If a unified speed parameter is adopted, in the request sent by the MGC to the MG, the delivery bandwidth signal may include the speed parameter, where the value of the speed parameter is the ratio of the requested speed to the normal speed, and the speed parameter is defined as keeping the current speed by default. In the response sent by the MG to the MGC, the delivery bandwidth signal may also include the speed parameter, where the value of the speed parameter is the ratio of the actual speed to the normal speed, and the speed parameter is defined as adopting the requested ratio by default.

If independent speed parameters are adopted, the delivery bandwidth signal may include the above requested speed parameter in the request sent by the MGC to the MG, where the value of the speed parameter is the ratio of the requested speed to the normal speed, and the speed parameter is defined as keeping the current speed by default. Meanwhile, the delivery bandwidth signal may also include the above actual speed parameter, but the value of the speed parameter is "select" indicated by a wildcard "$", representing that the MGC expects to obtain the actual speed adopted by the MG. In the response sent by the MG to the MGC, the delivery bandwidth signal may also include the actual speed parameter, where the value of the speed parameter is the ratio of the actual speed to the normal speed, and the speed parameter is defined as adopting the requested ratio by default. Thus, the media gateway control protocol is extended to provide a support mechanism for adjusting the delivery bandwidth for executing the signal.

When delivering the delivery bandwidth signal, the MGC should also deliver a signal and/or signal list corresponding to the signal, so as to enable the signal and/or signal list to continue to be valid. Of course, after the MG has received the delivery bandwidth signal, if the MG automatically stores the signal and/or signal list corresponding to the signal according to a setting in advance while adjusting the signal and/or signal list, the same purpose can be achieved. Thus, the MGC is enabled to flexibly select an opportunity to perform delivery bandwidth adjustment on a signal and/or signal list on a certain termination or stream or on a signal and/or signal list associated with a certain media resource thereof depending upon the actual demands, and meanwhile, an executing process of the signal remains uninterrupted, without the need of performing signal transmission from the very beginning.

Meanwhile, the ratio of the adjusted speed to the normal speed may be represented by a property in the above embodiments, the type and the value of the property are the same as the above speed parameter, and the property is readable and writable. The property may be applied to a termination or a stream on the termination, and may be correspondingly used in a TerminationState descriptor or a LocalControl descriptor respectively, representing adjusting the delivery bandwidth for all signals on the termination or the stream.

The MG according to the embodiment of the present invention adjusts a signal through signal delivery bandwidth adjusting information carried by an extended media gateway control protocol (H.248 or MGCP) message, and thus a simple and highly efficient solution is provided for adjusting a signal delivery bandwidth. Furthermore, in the embodiment of the present invention, the MG receives a signal or signal list corresponding to the signal delivery bandwidth adjusting information while receiving a command request, or the MG stores the signal and/or signal list corresponding to the signal delivery bandwidth adjusting information while adjusting the signal delivery bandwidth according to the signal delivery bandwidth adjusting information, so as to indicate a validity of the signal and/or signal list and indicate that the executing process of the signal and/or signal list remains uninterrupted. Thus, the embodiment of the present invention achieves the purpose of adjusting the signal delivery bandwidth without interrupting the execution of the signal.

The above descriptions are merely some exemplary embodiments of the present invention, but not intended to limit the scope of the present invention. Any modification, equivalent replacement, or improvement made according to the appended claims of the present invention should fall within the scope of the present invention.

What is claimed is:

1. A method for adjusting a signal delivery bandwidth, comprising:
   receiving, by a media gateway (MG), a command request carrying signal delivery bandwidth adjusting information comprising a target ratio of a target speed, to which a speed of a signal is to be adjusted, to a normal speed; and
   adjusting, by the MG, a delivery bandwidth of the signal according to the target ratio;
   wherein
   the signal delivery bandwidth adjusting information further comprises at least one of a signal identifier identifying the signal that needs to be adjusted, a signal list identifier identifying a signal list that needs to be adjusted, and a media resource identifier identifying a media resource that needs to be adjusted,
   the adjusting, by the MG, the delivery bandwidth of the signal according to the target ratio comprises adjusting, by the MG, the delivery bandwidth of the signal corresponding to at least one of the signal identifier, the signal list identifier, and the media resource identifier, according to the target ratio, and
   the signal delivery bandwidth adjusting information is represented by a representing signal in a package, and at least one of the target ratio, the signal identifier, the signal list identifier, or the media resource identifier in the delivery bandwidth adjusting information is represented by parameters of the representing signal.

2. The method for adjusting a signal delivery bandwidth according to claim 1, wherein the adjusting, by the MG, the delivery bandwidth of the signal according to the target ratio comprises:

determining whether the signal identifier and/or the signal list identifier in the signal delivery bandwidth adjusting information matches with a signal and/or a signal list on a corresponding termination or stream, or whether the media resource identifier in a delivery bandwidth signal matches with a corresponding media resource;

adjusting the delivery bandwidth of the signal according to the target ratio, if the determining result is Yes; and returning error response information, if the determining result is No.

3. The method for adjusting a signal delivery bandwidth according to claim 1, wherein after the adjusting, by the MG, the delivery bandwidth of the signal according to the target ratio, the method further comprises:

sending, by the MG, a command response carrying signal delivery bandwidth adjusting information, wherein the signal delivery bandwidth adjusting information comprises an actual ratio of an actual speed, after the signal is adjusted, to a normal speed.

4. The method for adjusting a signal delivery bandwidth according to claim 3, wherein the target ratio and the actual ratio adopt a unified ratio parameter or adopt independent ratio parameters; and when the unified ratio parameter is adopted, a received ratio parameter is the target ratio and a sent ratio parameter is the actual ratio.

5. A media gateway (MG), comprising:

a receiving unit, configured to receive a command request carrying signal delivery bandwidth adjusting information comprising a target ratio of a target speed, to which a speed of a signal is to be adjusted, to a normal speed; and an adjusting unit, configured to adjust a delivery bandwidth of the signal according to the target ratio;

wherein:

the signal delivery bandwidth adjusting information further comprises at least one of a signal identifier identifying the signal that needs to be adjusted, a signal list identifier identifying a signal list that needs to be adjusted, and a media resource identifier identifying a media resource that needs to be adjusted, the adjusting unit is configured to adjust the delivery bandwidth of the signal corresponding to at least one of the signal identifier, the signal list identifier, and the media resource identifier, according to the target ratio, and the signal delivery bandwidth adjusting information is represented by a representing signal in a package, and at least one of the target ratio, the signal identifier, the signal list identifier, or the media resource identifier in the delivery bandwidth adjusting information is represented by parameters of the representing signal.

6. The MG according to claim 5, wherein the adjusting unit further comprises:

a determining module, configured to determine whether the signal identifier and/or the signal list identifier in the signal delivery bandwidth adjusting information matches with a signal and/or a signal list on a corresponding termination or stream, or whether the media resource identifier in a delivery bandwidth signal matches with a corresponding media resource; and an adjusting module, configured to adjust the delivery bandwidth of the signal according to a determining result of the determining module.

7. The MG according to claim 5, further comprising:

a sending unit, configured to send a command response carrying error response information or adjusted signal delivery bandwidth information.

* * * * *